United States Patent
Lalji et al.

(10) Patent No.: US 10,645,034 B2
(45) Date of Patent: May 5, 2020

(54) SYSTEM AND METHOD FOR FACILITATING COMPUTER GENERATED CONVERSATIONS WITH THE AID OF A DIGITAL COMPUTER

(71) Applicant: SMARTBOTHUB, INC.

(72) Inventors: Alkarim "Al" Lalji, Bothell, WA (US); Andrew Alan Wells, Madeira Beach, FL (US)

(73) Assignee: SMARTBOTHUB, INC., Kirkland, WA (US)

( * ) Notice: Subject to any disclaimer, the term of this patent is extended or adjusted under 35 U.S.C. 154(b) by 47 days.

(21) Appl. No.: 15/494,385

(22) Filed: Apr. 21, 2017

(65) Prior Publication Data

US 2017/0310613 A1     Oct. 26, 2017

Related U.S. Application Data

(60) Provisional application No. 62/326,274, filed on Apr. 22, 2016.

(51) Int. Cl.
*H04L 12/58*     (2006.01)
*H04L 29/08*     (2006.01)
(Continued)

(52) U.S. Cl.
CPC .............. *H04L 51/02* (2013.01); *G06F 40/30* (2020.01); *G06N 3/006* (2013.01); *G06N 20/00* (2019.01); *H04L 63/083* (2013.01); *H04L 67/20* (2013.01)

(58) Field of Classification Search
CPC ....... H04L 51/02; H04L 51/043; H04L 67/30; H04L 69/329; H04L 51/04; H04L 51/38;
(Continued)

(56) References Cited

U.S. PATENT DOCUMENTS 7,009,940 B2    3/2006  Vialen et al.
9,392,112 B2 *  7/2016  Vymenets ........... H04M 3/5175
(Continued)

OTHER PUBLICATIONS

L. Kunze, "On Chatbots", Tech Crunch, https://techcrunch.com/2016/02/16/on-chatbots/, Feb. 16, 2016 (Feb. 16, 2016).

*Primary Examiner* — Djenane M Bayard
(74) *Attorney, Agent, or Firm* — Patrick J. S. Inouye; Leonid Kisselev

(57) ABSTRACT

The flexibility of a communication with a chatbot can be increased using a chatbot platform that can be integrated with a plurality of chat channels as well as facilitate communication between users of different chat channels. The platform can host chatbots that can leverage a plurality of resources, including internal and external natural language processors, machine learning, analytics services, and third party services to generate a response to user communications and take actions on behalf of the user. The use of the natural language processing and other additional information allows to generate an appropriate response to user queries, and to thus increase the speed with which user concerns are address. Further, the platform includes a chatbot creation program that allows a quick way to create a large number of customized chatbots without requiring advanced programming skills from the chatbot creator.

20 Claims, 8 Drawing Sheets

(51) Int. Cl.
*G06N 20/00* (2019.01)
*G06N 3/00* (2006.01)
*H04L 29/06* (2006.01)
*G06F 40/30* (2020.01)

(58) Field of Classification Search
CPC ......... H04L 67/04; H04L 67/18; H04L 67/24;
H04L 51/046; H04L 51/16; H04L 67/306;
H04L 12/1813; H04L 67/02; H04L 67/10;
H04L 51/32; H04L 51/066; H04L 67/20;
H04L 67/141; H04L 51/06; H04L 67/28;
H04L 63/0457; H04L 5/001; H04L
5/0053; H04L 5/0091; H04L 27/2601;
H04L 5/0058; H04L 5/0092; H04L
12/1881; H04L 12/189; H04L 1/0003;
H04L 1/00; H04L 1/0007; H04L 1/0009;
H04L 5/0048; H04L 5/0094; H04L
1/0046; H04L 1/1829; H04L 1/1861;
H04L 2025/03802; H04L 5/0055; H04L
63/08; H04L 5/0023; H04L 5/14; H04L
12/43; H04L 12/6418; H04L 1/0026;
H04L 1/0039
See application file for complete search history.

(56) References Cited

U.S. PATENT DOCUMENTS

| | | | |
|---|---|---|---|
| 9,450,901 B1* | 9/2016 | Smullen | H04L 51/046 |
| 2012/0041903 A1* | 2/2012 | Beilby | G06N 3/004 |
| | | | 706/11 |
| 2012/0260263 A1 | 10/2012 | Edoja | |
| 2015/0235240 A1* | 8/2015 | Chang | G06Q 30/0202 |
| | | | 705/7.31 |
| 2017/0048170 A1* | 2/2017 | Smullen | H04L 67/322 |
| 2017/0279906 A1* | 9/2017 | Laird-McConnell | ........................ |
| | | | H04L 67/10 |

* cited by examiner

40

40

80

90

SYSTEM AND METHOD FOR FACILITATING COMPUTER GENERATED CONVERSATIONS WITH THE AID OF A DIGITAL COMPUTER

CROSS-REFERENCE TO RELATED APPLICATION

This non-provisional patent application claims priority under 35 U.S.C. § 119(e) to U.S. Provisional Patent Application, Ser. No. 62/326,274, filed Apr. 22, 2016, the disclosures of which are incorporated by reference.

FIELD

This invention relates in general to electronic communications, and in particular, to a system and method for facilitating conversations with the aid of a digital computer.

BACKGROUND

Development of communication via the Internet has transformed human lives in many areas, including how businesses interact with their customers. Whereas early Internet businesses have primarily relied on the user interface of their websites for communication with their customers when the communication did not have to be interactive, and on human agents acting via the Internet or another medium when an interactive two-way communication was necessary, the limitations of such communications became apparent over time. Thus, the number of customers that human agents can help is inherently limited, creating long wait times when the number of customers exceeds the number of available agents. Likewise, a customer trying to take an action, such as to receive information or order a particular product or service via a website, may be frustrated by how long completing the task and identifying correct information takes.

Chatbots, computer programs that can conduct a conversation with a human by executing a particular workflow, have recently made inroads into customer service. For example, automated online assistants include a chatbot that solicits input from a user and translates the input into a format that can be used by an expert system to find an answer to user queries. While such chatbots can increase the speed with which a customer receives assistance without requiring an increase in the number of human agents involved in customer service, the current chatbot technology still suffers from multiple drawbacks.

First, creating a chatbot customized for a particular business can require tremendous efforts and expertise, which may not be available to a majority of entities, such as individuals or business, in need of such a bot. The required resources increase along with the number of chatbots needed, and if an entity offers goods or services diverse enough to require multiple chatbots, getting the required chatbots may be unattainable.

Further, even if a chatbot is available to assist a customer, accessing such chatbot generally requires the customer to use specific software. Thus, a customer may be required to enter a particular chatroom or install a particular software. These technical requirements not only require a customer to spend additional time to interact with the chatbot, but may also prevent the customer from accessing the chatbot entirely if the computing device of the customer is not compatible with the technical requirements.

Finally, the answers that a chatbot can provide to a user are generally limited by the information stored internally by the system to which the chatbot interfaces. If the stored information is insufficient, the chatbot may not be able to assist the customer. Further, such chatbots generally lack any insight on the user, and may not customize their responses to the specific demands of a particular user. Finally, such bots usually employ a sequential conversation flow, and the speed with which the conversation proceeds is limited by the length of the sequence.

Accordingly, there is a need for a flexible way to facilitate interactions with chatbots that can leverage a plurality of sources of information and for an easy, scalable, way to produce such chatbots.

SUMMARY

The flexibility of a communication with a chatbot can be increased using a chatbot platform that can be integrated with a plurality of chat channels as well as facilitate communication between users of different chat channels. The platform can host chatbots that can leverage a plurality of resources, including internal and external natural language processors, machine learning, analytics services, and third party services to generate a response to user communications and take actions on behalf of the user. The use of the natural language processing and other additional information allows to generate an appropriate response to user queries, reducing the sequence of steps that needs to be taken, and thus increasing the speed with which user concerns are address. Further, the platform includes a chatbot creation program that allows a quick way to create a large number of customized chatbots without requiring advanced programming skills from the chatbot creator.

One embodiment provides a system and method for facilitating computer-generated conversations. A platform that includes a plurality of servers receives via one of a plurality of chat channels a communication from a computing device directed at a chatbot hosted by the platform, the chatbot associated with a workflow including a plurality of steps. An integrity check of the chat channel is performed. Upon the chat channel passing the integrity check, the step in the workflow to be performed in response to the received communication is determined based on the chat channel via which the communication was received. The parsed communication is analyzed. A response communication is generated by the chatbot based on the analysis and the determined step. The response communication is formatted by the platform for transmission via the chat channel and sent to the computing device via the chat channel.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
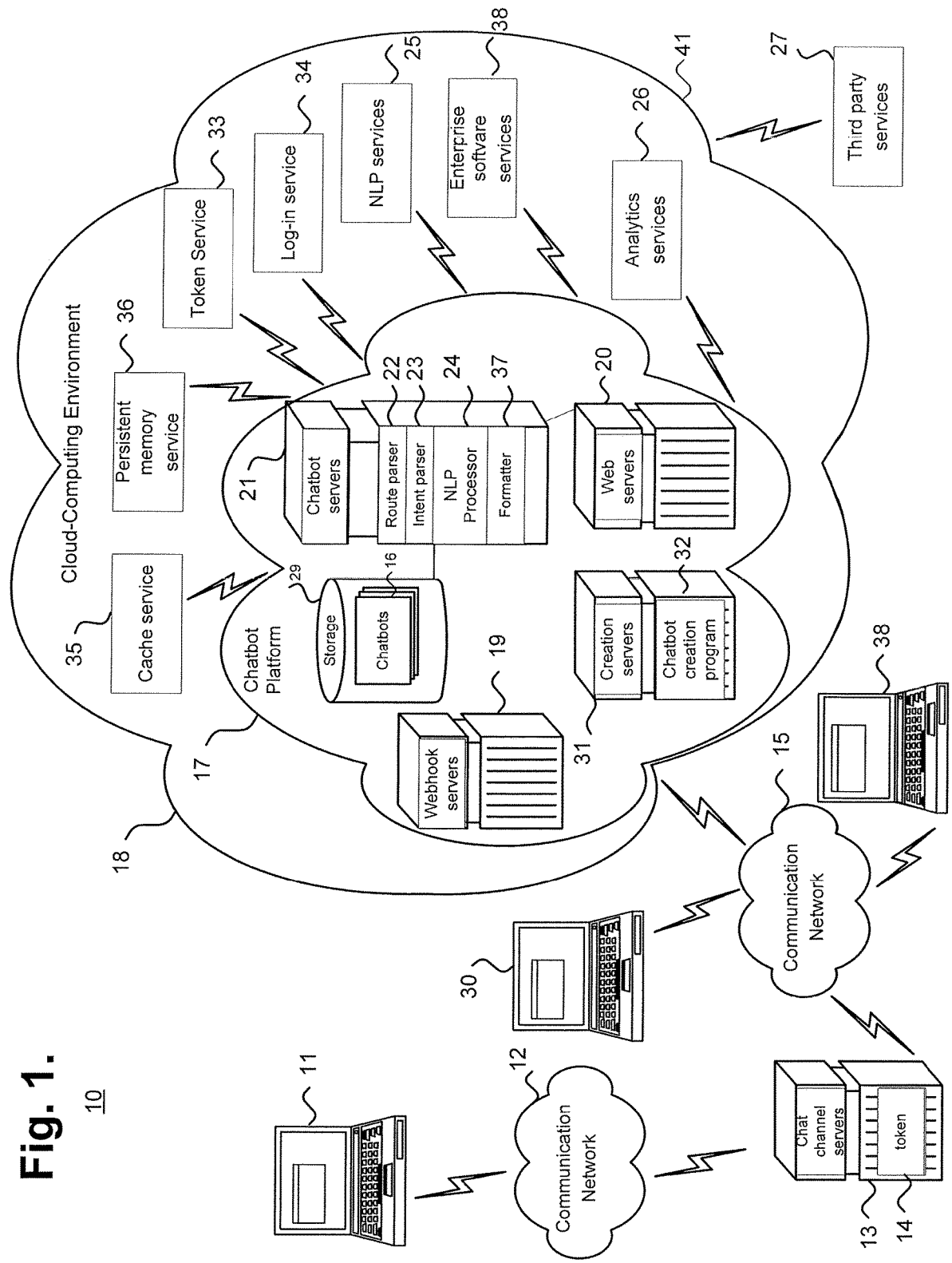
FIG. 1 is a block diagram showing a system for facilitating computer-generated conversations in accordance with one embodiment.

FIG. 1 is a block diagram showing a system 10 for facilitating computer generated conversations in accordance with one embodiment. The system 10 includes one or more user devices 11 that can connect via a communication network 12 to one or more servers 13 executing one or more communication channels, via an interface such as a web-browser or a dedicated application. In particular, the computing device 11 can communicate via the communication channels with another party. Such communications can be based on input of a user, which can be a human user or a chatbot relaying the received information to a human end-user.

While the user device 11 is shown as a laptop, other kinds of user devices, such as desktop computers, smartphones, tables, and smart-watches, that can connect to a communication channel via a communication network 12 are possible. The communication network 12 can be a cellular network or the Internet, though other kinds of communication networks 12 are also possible.

The chat channels implemented by the servers 13 are services that can relay messages between two or more participants in a conversation. Examples of such channels include social networking chat services, such as Facebook® chat, as well as standalone messaging services, such as Skype®, Kik®, Telegram®, and SMS messaging services. Other kinds of chat channels are possible.

The chat channel servers 13 for each of the chat channels can generate a token 14, such as a Jason Web Token (JWT), and provide the token 14 to the computing device via the communication network 12. The computing device 11 can subsequently include the token 14 with all of the messages sent to that chat channel to verify the identity of the user of the computing device 11 and to make sure that a response communication is returned to the correct user.

As described further below, one more chatbots 16 can be registered with the chat channels, allowing a user of the chat channels to communicate with the chatbots 16 via the chat channel servers 13. Thus, by way of example, a user of the computing device 11 can search for chatbots 16 registered with a channel using the interface to that channel (such as the web-browser executing on the computing device 11 or the application running on the computing device 11), and select the chatbot 16 the user would like to communicate with, such as by typing in a hashtag associated with the selected chatbot 16 into the interface. Other ways to specify the chatbot 16 the user would like to conversate with are possible. Subsequently, after the user specifies to the chat channel services, the chatbot 16 that the user would like to communicate with, the messages sent from the computing device 11 during that conversation session would be forwarded by the chat channel servers 13 to the appropriate chatbot 16. The communication from the user of the computing device 11 can be in any format, including text, audio, or video communication. Further, the communication can be coupled with a request, such as a POST request in the HTTPS protocol, requesting the service 17 to accept the communication and to forward the communication to the selected chatbot 16.

The chatbots 16 are implemented as part of a chatbot platform 17, which can be implemented within a cloud-computing environment 18. Each chatbot 16 includes software modules that define the functionality of the chatbot 16 and a workflow associated with that chatbot 16, a series of steps that the chatbot 16 follows during a conversation with the user. In a further embodiment, the chatbot platform 17 can be implemented on dedicated servers in the same physical location. The cloud-computing environment can be a part of Amazon Web Services® offered by Amazon.com Inc. of Seattle, Wash., such as by being a part of Amazon® Elastic Load Balancer, though other kinds of cloud-computing environments are possible.

Upon receiving a communication directed to one of the chatbots 16 in the chatbot platform 17, one or more of the chat channel servers 13 will send the communication to the chatbot platform 17 via a communication network 15. The communication network 15 can be the Internet or a cellular network, though other kinds of communication networks 15 are possible. The communication network 15 can be the same network as the communication network 12, or a different network than the communication network 12.

The chatbot platform 17 includes one or more servers 19, each of which which is entry point and an exit point within the chatbot platform 17 for communications intended for and sent from a particular chatbot 16 ("webhook server 19). In one embodiment, each webhook server 19 can be a Node.js server, though other kinds of run-time environment can be executed on the server. Every chatbots 16 is associated with one of the webhook servers 19, and as further described below, when a chatbot 16 is registered with the chat channels, the chat channels are provided an address of the webhook server 19 designated for that chatbot 16. The webhook servers 19 receive the communication sent by the chat channel servers 13, and forward that communication for subsequent processing to other components of the platform 17. Upon the receipt of the communication, the webhook server 19 for a chatbot 16 that received the message performs an integrity check of the chat channel from which the communication was received via the communication network 15. Such integrity check can include checking that the chat channel is running properly, that the servers 13 implementing that chat channel are connected to the communication network 15, and that the requested chatbot 16 has been registered with the chat channel. Further, as part of the integrity check, the webhook server 19 would verify the token received with the communication with the issuer of that token (such as one of the chat channel servers 13) that the token received with the communication has indeed been issued by the issuer. The token issuer can also provide information about the user that the user that can be used by the chatbot 16 in generating the response. The integrity check of the channel can also be based on the received token and by verifying the IP address of the servers 13 from which the communication is received to make sure that the communication was received from the chat channel that the communication is purported to be from. Other kinds of integrity checks are possible.

If the integrity check is successful, the webhook server 19 passes the received communication to other components of the platform 17 for further processing. If the integrity check is failed, the webhook server 19 returns to the chat channel servers 13 an error message, and no further processing of the received message takes place. In addition, upon a successful completion of the integrity check, the webhook server 19 can retrieve metadata needed for the operation of the chatbot 16, such as metadata identifying an Internet address of the natural language processor employed by the chatbot 16. Other kinds of metadata is possible. For example, the metadata can include a token, such as a JWT token, necessary for logging into third party services 27 used by the chatbot 16. The metadata can be retrieved by the webhook server 19 sending a request for the data, such as HTTPS GET request, to a token service 33 storing the metadata, which can be part of the cloud-computing environment 18 or be outside the cloud-computing environment 18. In one embodiment, the token service 33 can be an OpenID® service, though other kinds of services are possible. Further, if the chatbot 16 needs to log-in into a third party service during the execution of the workflow for that chatbot 16, the webhook server 19 can interact with a log-in service 34, such as MS/AAD service, to perform the log-in. To perform the log-in the webhook server 19 can send a request, such as an HTTPS POST request, along with a token retrieved as part of the metadata, such as a JWT token associated with the chatbot 16, to the log-in into the service 34. The log-in service 34 in turn can return another token, such as another JWT token, verifying that the chatbot 16 has been logged into the appropriate service along with an appropriate request (such as HTTPS POST request). The received metadata and the token received from the log-in service can be stored in a local cache service 35, such as a REDIS® cache, interfaced to the chatbot platform 17, which allows a quick retrieval as necessary during the operation of the chatbot 16.

In addition, the webhook server 19 can store persistent data generated by the chatbot 16 in a persistent data storage service 36, such as the MongoDB® service, interfaced to the chatbot platform 17. Such persistent data can include data regarding the communications exchanged with the computing device 11 as well as other data solicited from the user of the computing device 11. The persistent storage service 36 can also be interfaced to the analytics service 26, allowing the analytics service 26 to access the persistent data in the storage service 36.

The received communication is passed from the webhook servers 19 to at least one web-server 20 with the chatbot platform 17, which can interpret the request that was included with the communication. In one embodiment, the web-server 20 can be an NGINX® distributed by NGINX® Software Inc. of San Francisco, Calif., though other kinds of web-servers 20 are also possible. Based on the request included with the communication, the web-server 20 determines the communication to include a message in need of a reply, and forwards the communication to one or more servers 21 implementing the chatbots 16 for subsequent processing.

The chatbot servers 21 implements a route parser 22, which determines the next step or steps in the workflow associated with the chatbot 16 that needs to be taken in response to the communication. Thus, the workflow could be thought of as a decision tree and the route parsing find the step in the decision tree that would need to be taken in response to the communication. For example, if the communication includes a greeting, the next step in the workflow could be to generate a return greeting and prompt the user to communicate further. As the format of communications from different channels differs from one another, the way route parsing is performed also differs depending on which chat channel the communication came from. Thus, while if communications that included identical messages from the user were received from different communication channels, the same step of the workflow would be determined as needing to be implemented. However, the way the step could be determined could different from channel to channel due to the differences in formatting of the communication.

The servers 21 further implement an intent parser 23 to determine an intent of the sender of the communication from the computing device 11. Such intent can include determining what language the communication was sent in and, thus the intent of the sender regarding what language the reply needs to be in. Further, when the sender's communication can have multiple meanings, the intent parser 23 can determine the most likely meaning. For example, if the communication includes a phrase "I want to find a golf club," the communication could potentially have multiple meanings. Thus, the sender could be looking to buy a club to hit a golf ball. Alternatively, the sender could be looking for a club where the sender could play golf. Still another option would be that the sender is looking for a club of owners of Volkswagen® Golf® cars. The ambiguity in the meaning of the phrase can be resolved by the intent parser 23 in multiple ways. First, the intent analyzer 23 can employ a natural language processor to generate and send a clarifying question to the sender of the communication via the chat channel servers 13, and analyze the received response to determine the meaning of the communication. The natural language processor 24 can be executed by the chatbot servers 21. Alternatively, the chatbot servers 21 can access a third party natural language processing service 25, such as Siri®, though other third party natural language processing services are also possible. The third party natural language processing service 25 can be located in the same cloud computing environment 18 as the chatbot platform; alternatively, the third-party natural language processor could be in another location accessible through the communication network 15. In addition, the intent parser 23 can access an analytics service 26 that can store information about the user associated with the computing device 11 as well as previous interactions of the user with the chatbot platform 17, and leverage the accessed data to determine the intent by looking at the context in which the communication was sent. For example, if the user has previously communicated with the chatbot platform 17 regarding Volkswagen® Golf® cars, the intent parser can determine the intent of the communication to be about finding a club of owners of the cars.

The analytics service 26 can be a part of the cloud-computing environment 19 or be in another location accessible through the communication network 15 and stores data regarding previous interactions of the sender with the chatbot platform 17 and analysis of such service information. Such stored information can include, by way of example, how many interactions the sender previously had with the chatbot platform 17, the average length of these interactions, the average price of purchases that the sender has previously made using the chatbot, though other kind of stored information is possible. In a further embodiment, the information stored in the analytics service 26 can be from a third party, such as the sender's social network profile, and include details regarding a sender that are not directly related to his or her interaction with the chatbot platform 17.

Figure 9:
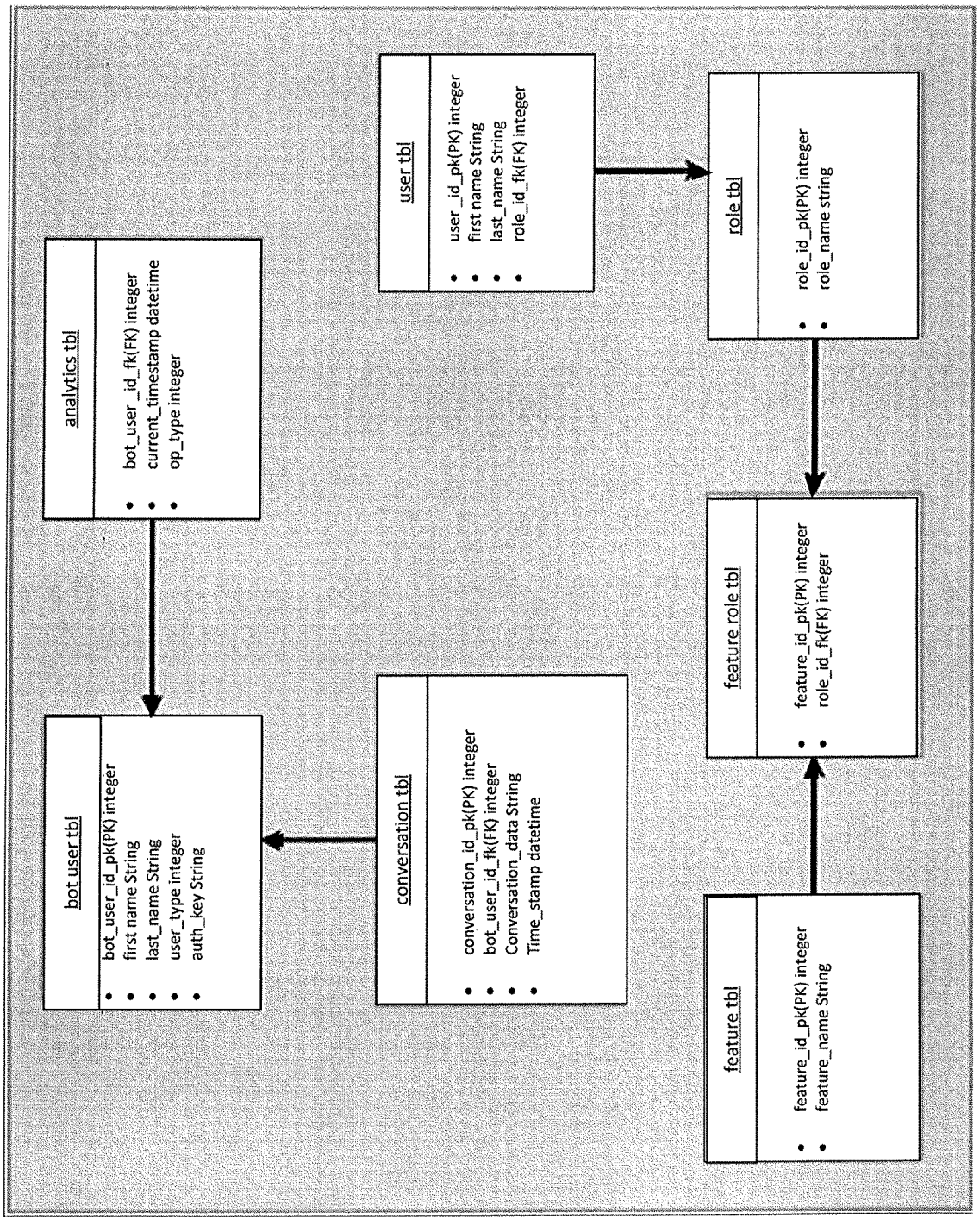
FIG. 9 is a database schema for use in the system of FIG. 1 in accordance with one embodiment.

Once the intent is determined, the communication is passed to the chatbot 16 for which the communication is intended. The chatbots 16 can be stored in a storage 29 coupled to the servers 21 and retrieved when a server 21 needs a particular chatbot 16 to respond to a user communication. The chatbots 16 can be stored in accordance with a schema shown with reference to FIG. 9, also other schemas are possible. As described above, each chatbot 16 includes instructions to execute a workflow defined by the creator of that chatbot 16, a plurality of steps that define the interaction with a user and other parties during a conversation. As described above, a particular step or steps that need to be taken in response to a communication is determined during route parsing. The step in the workflow that needs to be taken defines how the response is generated in combination with other factors. One such factor is the intent of the response communication that has been determined. If additional interpretation is needed, the chatbot 16 can use either the internal natural language processor 24 or the third party natural language processing service 25 to interpret the message, and to determine an appropriate response using the predefined workflow. In addition, the chatbot 16 can include a machine learning module (not shown), which can be trained, either on previous interactions with users or on other kinds of training samples, to classify the sender of the communication, either using through analysis of the message or using the information regarding the user obtained from the analytics service 26. For example, if in the communication, the sender of the message is asking to show options for preparing a tax return and states that he has a certain income, the machine learning module would classify the sender as falling into a certain tax bracket, and execute the step or steps in the workflow to present the sender the message with the options for a person falling into that tax bracket. Likewise, if the sender's income is accessed through the analytics service 26, the machine learning module can make the same classification. Further, additional information from the analytics service 26 can further impact the execution of the step or steps in the workflow. Thus, if the sender requests information regarding products that can fall within a wide range of prices, even if the chatbot 16 is in possession of the information that the sender is a high-income earner, if the analytics service provides that in the past, the sender has purchased the cheapest available products, the chatbot 16 would execute the workflow to generate the response communication that would include the cheapest available options.

As part of the execution of a workflow, the chatbot 16 can utilize one or more application programming interfaces (APIs) included in the chatbot 16 for interacting with third party services 27 that are accessible over the communication network 15 regardless of whether they are in the cloud-computing environment 18. Such interactions can include obtaining third party information for inclusion into the generated response message or for taking an action based on the user message. The third party services 27 can in turn include an API for interacting with the chatbot 16 API. For example, if the received communication includes a request for local weather, the chatbot 16 can retrieve weather data from a third party weather service. Likewise, if a user requests information for available flights for a particular date from Seattle, Wash. to San Francisco, Calif., the chatbot 16 would through the appropriate API to request the information from a travel service allowing online booking of flights and include the received information into the response communication. Upon receiving a further communication that includes the sender's choice for one of the flights, the chatbot 16 can request the user's personal information necessary for booking a flight and payment information of the sender, such as a credit card information necessary to pay for the flight. The chatbot 16 receive the details and the information in subsequent messages from the computing device 11 and would use the personal details and the payment details to book the selected flight, and upon receiving confirmation details from the third party service 27, include the confirmation details into the response communication that is sent to the user.

The chatbots 16 can further interact with still other services, either within the cloud-computing environment or outside of the cloud-computing environment 15 and use the results of the interaction for generating the response communication. For example, the chatbot 16 can interact with an enterprise software service 38 that integrates information from a plurality of line-of-business applications. In one embodiment, the service 38 can be Enterprise Cloud Connect™ service provided by SmarTek21, LLC, of Kirkland, Wash. Other enterprise software services are possible 38. Still other services with which the chatbot 16 can interact are possible.

As described above, the result of a running of a chatbot 16 is a response communication that is sent to the computing device 11 via the same chat channel that the initial communication was received from. The chatbot servers 21 further execute a communication formatter 37, which prior to the communication being sent out to the computing device 11, is formatted for the requirements of the communication channel via which the response communication will be sent. Thus, if the response communication will be made via Skype®, the response communication is formatted into the format (such as a particular kind of a JSON object) appropriate for transmission via Skype®. As mentioned above, the communication sent from the computing device 11 can be in any medium, including text, video, and audio. Similarly, the response communication can be in any medium, including text, video, and audio.

Once the response communication is formatted by at least one of the chatbot servers 21, the response communication is sent by the chatbot server 21 to the webhook server that is associated to the chatbot 16 that generated the message and into which the incoming communication for the chatbot 16 was initially received. The webhook server 19 in turn sends the response communication to the computing device 11 via the communication networks 12, 18 and the chat channel servers 13. The response communication is sent along with the token 14 associated with the user, which the chat channel servers 13 can use for forwarding the response communication to the computing device 11 of the user. The response communication can also be coupled to a request in a computing language, such as an HTTPS POST request, directing the chat channel servers 13 to forward the communication to the computing device 11. The chatbot 16 can further retrieve information about the received communication and the communication sent in the analytics service 26.

While the sender of the communication can use a conversation with a chatbot 16 to obtain information or to perform another online action, the chatbot platform 17 can also be used to facilitate conversation between multiple users who are using multiple communication channels. The conversation can begin by a first user requesting one of the chat channel servers 13 to create a chatroom. The request can be made before or after the user selects to talk to a chatbot 16. The chatroom is associated with an identifier, which is conveyed by one of the chat channel servers to the chatbot platform 17 via the communication network 15. The chatbot platform 17 can in turn provide the identifier to other chat channels with which the chatbot 16 is registered. Subsequently, a second user, using a second computing device 30 and a second chat channel can select the chatroom, such as by searching identifiers of chatrooms that have been communicated to the different chat channel as being used for the conversation with the chatbot 16 in question. The communications posted by the first user into the chatroom are forwarded to the chatbot 16 by the chat channel servers 13 for the channel used for hosting the chatroom, as described above. Upon receiving the message, at least one chatbot server 21, using at least one of the chatbot 16 and the formatter 37, formats the received communication for transmission to the second chat channel and sends the formatted communication to the second user via the second chat channel. Likewise, the communications sent by the second user to the chatbot platform 17 via the second chat channel, are formatted for transmission to the first communication channel and sent by the chatbot platform 17 to the first communication channel for posting in the chatroom. Thus, the communications posted by the first user in the chatroom are forwarded by the chatbot platform 17 to the second user, and the communications sent by the second user are sent for posting in the chatroom, allowing both users to see each other's communications despite using different communication channels. While in the above description, the chatbot platform 17 acts as merely a relay, in a further embodiment, the chatbot 16 can generate a response communication to the communications from each the users and provide that response communications to each of the users. While in the example above, only two users are involved, any number of users of any number of differing chat channels with which a chatbot 16 is registered can participate in a multi-channel conversation via the facilitation of the chatbot platform 16.

Figure 2:
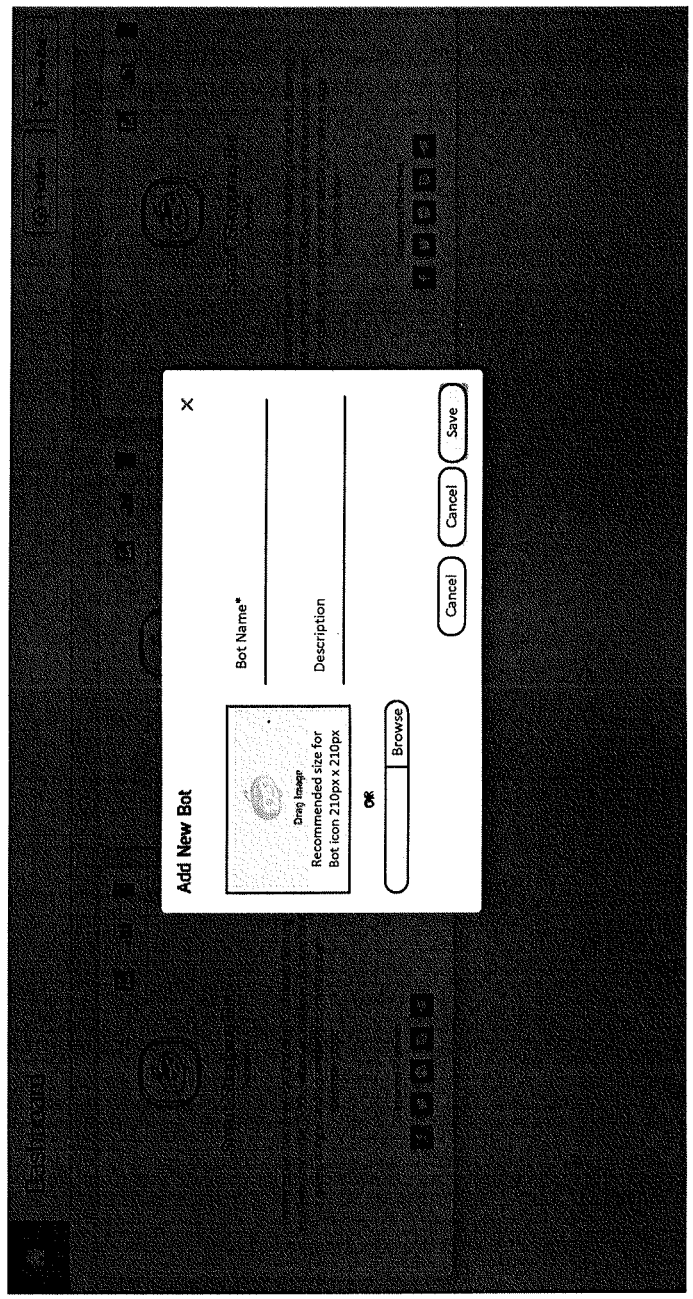
FIG. 2 is a screenshot of the user interface of the chatbot creation program of FIG. 1 in accordance with one embodiment.
Figure 3:
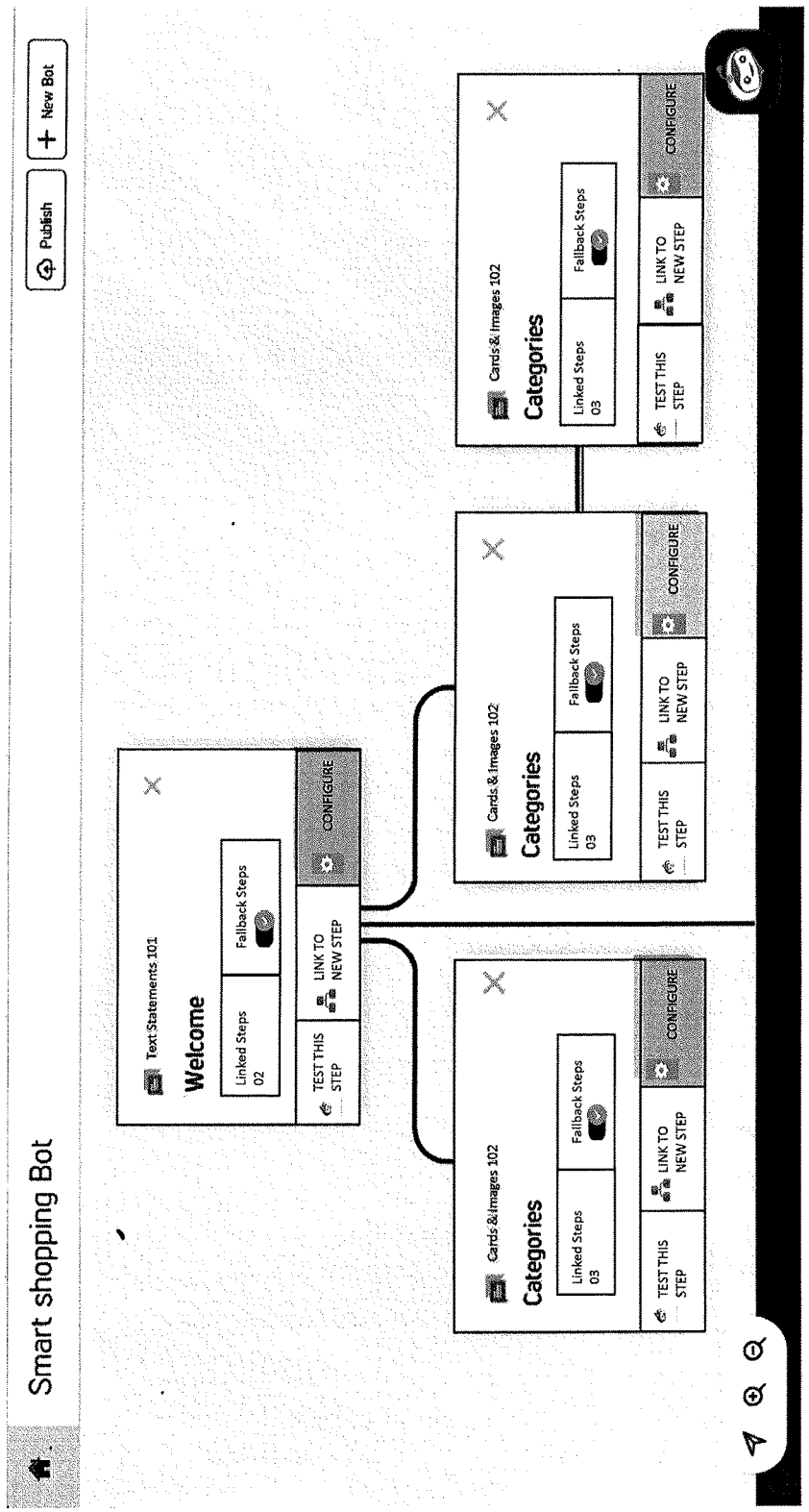
FIG. 3 is a screenshot of the user interface of the chatbot creation program of FIG. 1 showing workflow creation in accordance with one embodiment.

In addition to providing for a quick and efficient way to obtain desired information and perform user actions, the chatbot platform 17 also provides a scalable way to create chatbots 16 with desired properties without requiring specialized programming knowledge from a user. Thus, a creator of one of the chatbots 16 can connect via the communication network 15 to one or more chatbot creation servers 31 that implement a chatbot creation program 32 via computing device 38, which provides a user interface for defining characteristics of a chatbot 16 that the user desires to create. FIG. 2 is a screenshot of the user interface 40 of the chatbot creation program 32 of FIG. 1 in accordance with one embodiment. The user interface 40 includes a window 41 into which the chatbot creator can enter the desired name of the chatbot 16, a description of the chatbot that could be displayed to an end-user, and an image associated with the chatbot 16 that could be displayed to the end-user. The user interface 40 further provides a way for the user to define the steps of the workflow that will be executed by the chatbot 16. FIG. 3 is a screenshot of the user interface 40 of the chatbot creation program 32 of FIG. 1 showing workflow creation in accordance with one embodiment. As can be seen with reference to FIG. 3, a user can visually link each of the steps in the workflow, test the execution of each of the steps, configure what happens during each of the steps, and define fallback steps for that step, such as a step that is done if a particular chat channel is not compatible with the current step. In addition, through windows of the user interface that are not shown, the user can enter the channels that the creator would like to enter the chatbot 16 to be registered with as well as creator preferences for configuring the chatbot on each of the selected channels. Thus, among the configuration preferences, the creator can define how the chatbot will be represented within the chat channel, such as the amount of details regarding a product advertised by the chatbot 16 that will be displayed, elements of the user interface, how the page in the chat channel will look into which the user can enter payment details, and whether additional APIs can be called when the particular chat channel is used. In addition, as further defined with reference to FIG. 4, the creator can select one or more predefined software modules that impart the chatbot 16 being created desired functionality.

Upon receiving the user preferences from the creator of the chatbot 16, the chatbot creation program 32 compiles the chatbot 16 based on the input. The chatbot creation program 32 also assigns one of the webhook servers 19 as the endpoint for the new chatbot 16 to which the communications directed to that bot arrive and from which the communications from that chatbot leave. The chatbot creation program 32 further generates credentials for the chatbot 16, such as an identifier of the chatbot, which can be an alphanumeric identifier or another kind of identifier, and a password necessary for making changes to or otherwise managing the developed chatbot 16. The chatbot 16 is configured for each of the chat channels selected by the creator by the chatbot creation program 32 and an exchange of messages between the chatbot 16 and the channels is performed under the control of the chatbot creation program 32. The URL of the endpoint (webhook server 19) of the configured chatbot as well as chatbot description, name, and image, are provided to the channel servers 13, allowing the channel servers 13 to describe the chatbot 16 to the users of the communication device 11 and to contact the chatbot 16 when necessary. The created chatbot is stored by the chatbot servers, the retrieval of the chatbot 16 when running the chatbot 16 is necessary.

Figure 4:
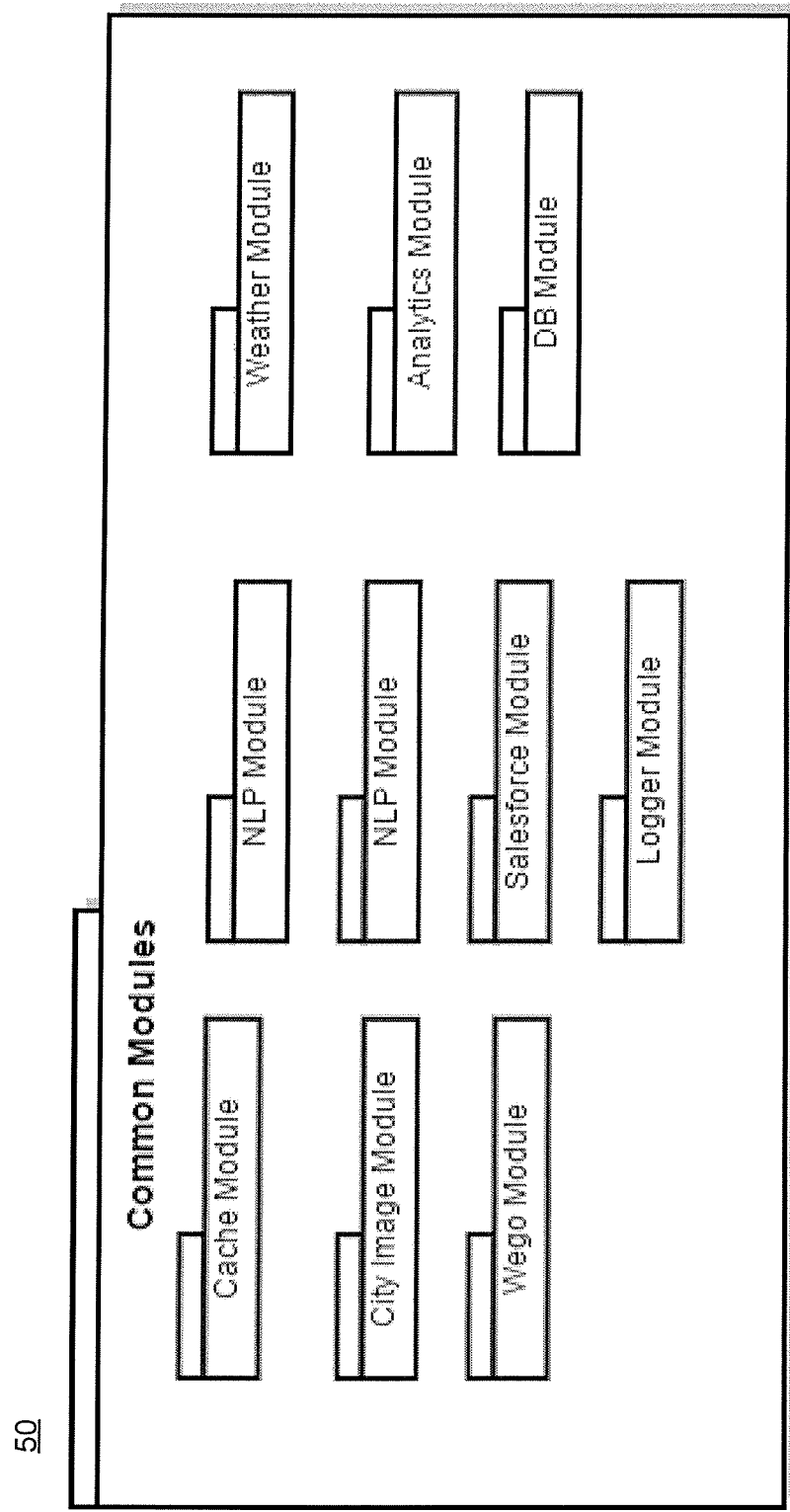
FIG. 4 is a diagram showing, by way of example, a plurality of possible modules that can be incorporated into a chatbot.

As mentioned above, in creating the chatbot 16, the user can select predefined modules that will impart a specific functionality on the newly-created chatbot 16. FIG. 4 is a diagram showing, by way of example, a plurality of possible modules that can be incorporated into a chatbot 16. Each of the modules is a computer program or procedure written as source code in a conventional programming language that can be presented for execution by the central processing unit as object or byte code. By way of example, the modules can include a cache module for interacting with a local cache; a city image module for retrieving from a third party service 27 images of a particular city and including them in a response communication; a Wego module for interacting, such as via booking flights and obtaining flight information, with the third party travel service 27 Wego™; one or more natural language processors; a Salesforce Module for interacting with another third party service 27, cloud-computing service Salesforce®; a logger module for recording data; a weather module for accessing weather data from a third party weather service 27; an analytics module for accessing data from the analytics service 26; and a database module for storing data in a database. The modules are described only by way of examples, and other modules that can be incorporated into chatbots 16 are possible.

The servers 13, 19, 21,31 can each include one or more modules for carrying out the embodiments disclosed herein.

The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 32 can act as a specialized computer. For instance, when the modules are implemented as hardware, that particular hardware is specialized to perform the modeling and notification and other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

While the services 25, 26, 33, 34, 35, and 36 are shown to be within a cloud-computing environment 17, in a further embodiment, the services can be implemented differently. Thus, the various services described above, such as the cache service 35, the persistent memory service 36, the token service 33, the log-in service 34, the natural language processor services 25, enterprise software services 35, analytics services 26, and third party services 27 can be implemented by the hardware, such as servers and databases, within the cloud-computing environment 18 or by dedicated hardware.

The chatbot platform 17 can further implement a plurality of security measures, including executing a firewall by the webhook servers 19, as well as requiring the user to perform additional log-in protocols. For example, if the user has an account with a particular third party service 27 accessing which is necessary for the operation of the chatbot, upon the user selecting to send messages to a particular chatbot 16 in a particular chat channel, the user can be prompted to log-in into the third party service 27 via the chat channel. If the log-in successful, an ID or another token proving the successful log-in is coupled to the communication sent to the chatbot platform 17. In turn, the chatbot platform can provide include the ID in all calls to the third party service 27, proving that the user has logged-in into that third party service.

Other security measures, such a use of encryption of data being passed from the chatbot 16 to the computing device via the chat channel as well as encryption of user data otherwise present in the platform is also possible.

Figure 5:
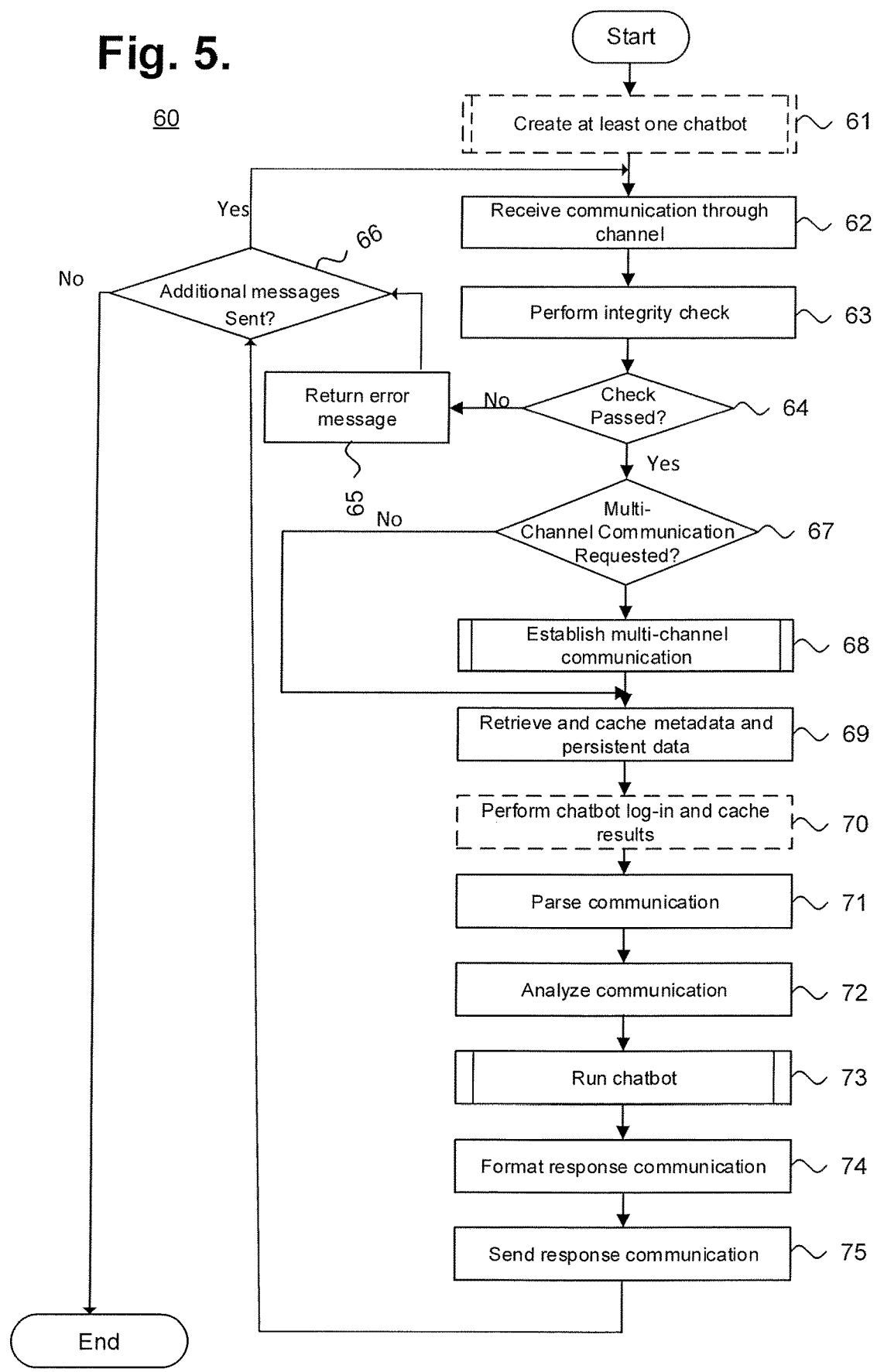
FIG. 5 is a flow diagram showing a method for facilitating computer generated conversations in accordance with one embodiment.

The chatbot platform facilitates interactions with a user over a variety of communication channels and can in turn interact with a variety of third party services, providing the flexibility necessary to quickly and efficiently to communicate with an end-user and accomplish a variety of user-defined tasks. FIG. 5 is a flow diagram showing a method 60 for facilitating computer generated conversations in accordance with one embodiment. The method 60 can be implemented using the system 10 of FIG. 1, though other implementations are also possible. Optionally (if no chatbots are stored on the chatbot platform, the step is required), one or more chatbots are created and registered with the communication channels based on user input, as further described below with regards to FIG. 6 (step 61). A communication from a computing device is received by the webhook service associated with the chatbot requested by the sender of the communication via at least one chat channel (step 62). The received communication can be coupled with a token that can be used for verification of the user of the computing device that sent the communication. The communication can also be coupled with a request, such as a request written in HTTPS protocol, to process the communication.

An integrity check is performed by the webhook server associated with the chatbot (step 63). The integrity check can include checking that the chat channel is correctly functioning, is compatible with the requested chatbot. The integrity check can also include checking the integrity of the communication. The integrity check can further involve verifying the token received with the issuer of that token. The integrity check can be token-based (using the token coupled to the communication) and IP address based, allowing to verify that the communication arrived from the IP address associated with the chat channel from which the communication is purported to be from. If the integrity check is failed (step 64), the webhook server returns an error message to the chat channel from which the communication came (step 65). If additional communication is sent to the chatbot platform (step 66), the method returns to step 62. If no additional communications are sent (step 66), the method 60 ends.

If the integrity check is passed (step 64), whether multi-channel communication was requested by the sender of the communication by the webhook server (step 67). If the multi-channel communication was requested (step 67), the multi-channel communication is established as further described below with reference to FIG. 7 (step 68). In a further embodiment, whether multi-channel communication is requested can be determined at a different point in the method 60. If no multi-channel communication was requested (step 67), the method 60 moves to step 69. Metadata necessary for running the chatbot 16 is retrieved and cached in a local cache (step 69), and, optionally, log-in of the chatbot into any third-party servers necessary for running the chatbot, with any tokens received from the log-in also being cached in the local cache (step 70). A route in the workflow associated with the chatbot is parsed, determining what next step or steps in the workflow is to be taken by the chatbot in response to the communication, with the route parsing being done based on the chat channel through which the communication was received due to the differences in formatting of the communications received through the different channels (step 71). The communication is analyzed to determine intent of the sender of the communication, such as by leveraging natural language processing or by determining the context in which the communication was sent using the data retrieved from an analytics service, as further described above with reference to FIG. 1 (step 72). The chatbot to which the communication is addressed is retrieved from storage (if the retrieval has not already been previously done) and run, as further described with reference to FIG. 8, generating a response communication (step 73). The generated communication is formatted into a format appropriate for the chat channel over which the communication was received (step 74). The response communication is sent to the computing device over the same chat channel through which the incoming message is received by the same webhook server that received the incoming communication, ending the message (step 75). If multi-channel communication was established, the response message and the initial communication are also formatted in step 75 for distribution to one or more users over one or more additional communication channels. In a further embodiment, if chatbot platform only acts as a relay for the additional communication, steps 71 and 72 could be skipped, and no response communication is generated during the running of the chatbot, with the chatbot only identifying the users to whom the received communication should be relayed.

Following the sending of the response message, if no further communications are received from the user (step 66), the method 60 ends. If further communications are received (step 66), the method 60 returns to step 62.

Figure 6:
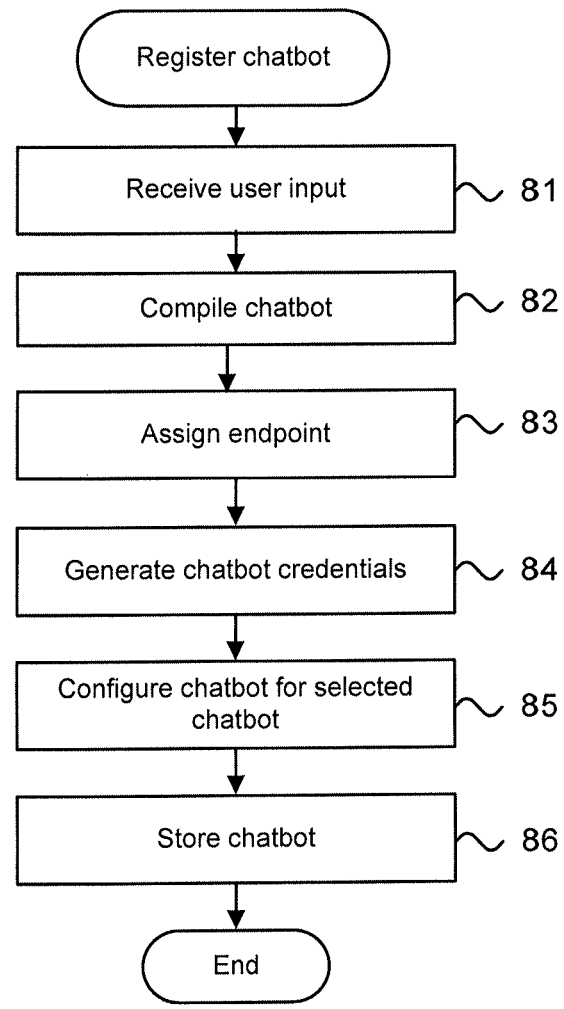
FIG. 6 is a flow diagram showing a routine for creating a chatbot for use in the method of FIG. 5 in accordance with one embodiment.

Providing a visual way to create the chatbots allows to easily build a large number of such chatbots without advanced programming skills. FIG. 6 is a flow diagram showing a routine 80 for creating a chatbot for use in the method 60 of FIG. 5 in accordance with one embodiment. Initially, user input for creating the chatbot is received at by the chatbot platform (step 81). Such input can include a desired name of the chatbot being created, a description of the chatbot that could be displayed to an end-user, an image associated with the chatbot 16 that could be displayed to the end-user, chat channels with which the bot needs to be registered, chat channel configuration preferences, the workflow which the chatbot needs to execute, and the modules that define the functionality of the chatbot. Other input is possible. The chatbot is compiled based on user input (step 82). The chatbot is assigned an endpoint within the chatbot platform, one of the webhook servers which will receive the messages addressed for that chatbot and from which the messages from that chatbot will be sent (step 83). Credentials, such as identifier and password, are generated for the chatbot, as further described above (step 84). The chatbot is registered with and configured for interaction with the chat channels, as further described above (step 85). The chatbot is stored on the chatbot platform in the storage, while the data associated with the chatbot 16 can also be stored in the services interfaced to the platform, such as the token service as described above (step 86), ending the routine 70.

Figure 7:
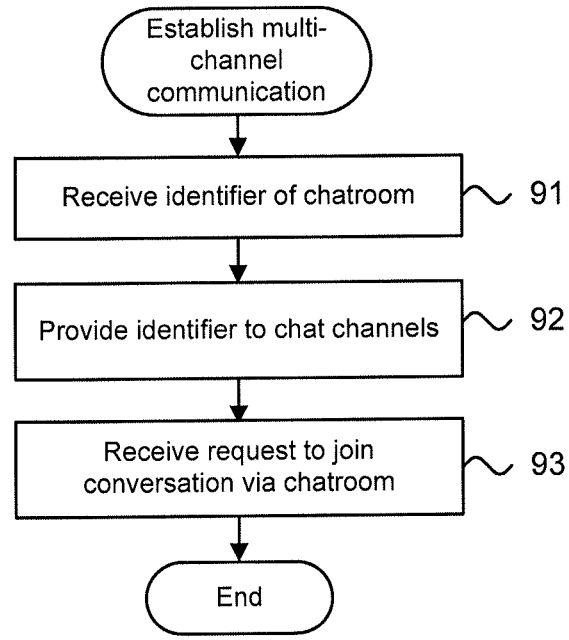
FIG. 7 is a flow diagram showing a routine for establishing multi-channel communication for use in the method of FIG. 5 in accordance with one embodiment.

Multi-channel communication allows users who employ different communication channels to talk to each other without having to sign up to use each other's communication channels. FIG. 7 is a flow diagram showing a routine 90 for establishing multi-channel communication for use in the method 60 of FIG. 5 in accordance with one embodiment. An identifier of a chatroom that the sender of the received communication has established in the chat channel over which the communication arrived is received by the webhook server associated with the chatbot (step 91). The chatbot provides the identifier to other chat channels with which the chatbot is registered (step 92), allowing the users of the chat channels to request communication via the chatroom. The chatbot receives one or more additional requests from one or more additional users of different communication channels (step 93), ending the routine 80. As described above, based on the received requests, the chatbot will relay the messages between the users using the chatroom.

Figure 8:
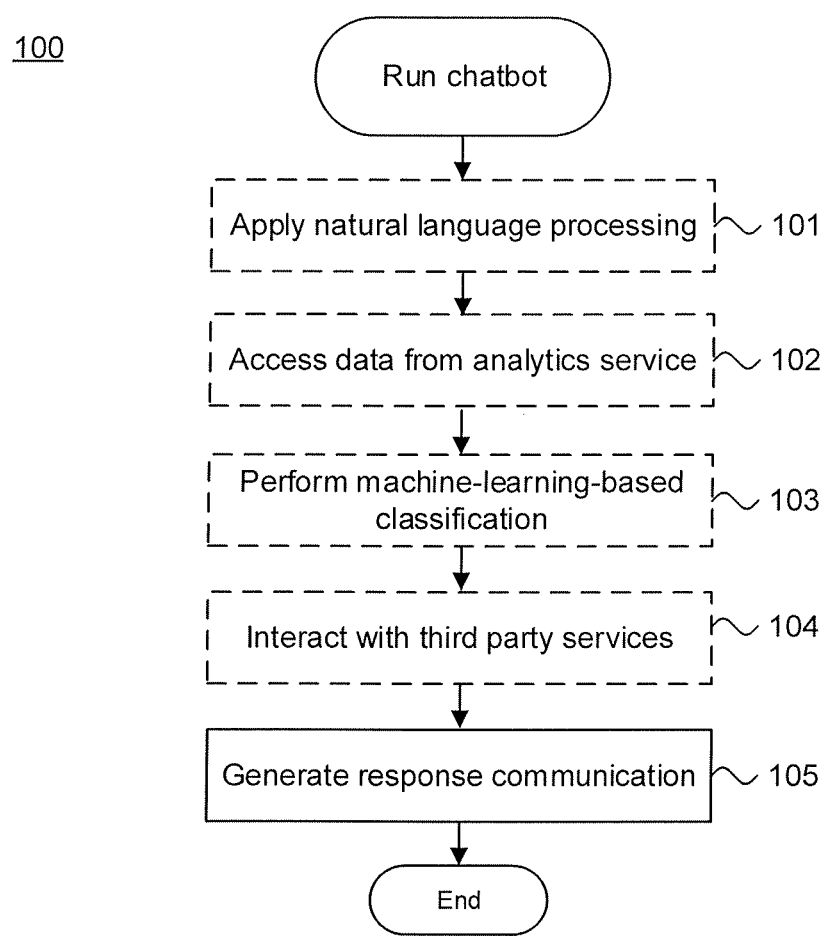
FIG. 8 is a flow diagram showing a routine 100 for running a chatbot for use in the method of FIG. 5 in accordance with one embodiment.

The chatbot can leverage multiple, internal and external services, to generate the response communication that addresses the user's needs in the most helpful and efficient fashion. FIG. 8 is a flow diagram showing a routine 100 for running a chatbot for use in the method 60 of FIG. 5 in accordance with one embodiment. Optionally, if necessary for additional analysis of the communication, the chatbot applies natural language processing to the communication, either via an internal natural language processor or an external natural language processor (step 101). Also, optionally, the accesses information regarding the sender of the communication from an analytics service to which the chatbot is interfaced (step 102). Optionally, the classifier can perform a machine-based learning classification based on the data in the communication, and the data received from the analytics service (step 103). Optionally, the chatbot interacts with a third party service, receiving additional information or taking action based on the communication, such as booking a flight for the sender of the message, as further described above (step 104). Based on the results of one or more of the steps 101-104, the step or steps in the workflow that is determined during route parsing (step 71), and the determined intent (step 72), the chatbot generates a response communication (step 105), ending the routine.

While the invention has been particularly shown and described as referenced to the embodiments thereof, those skilled in the art will understand that the foregoing and other changes in form and detail may be made therein without departing from the spirit and scope of the invention.

What is claimed is:

1. A system for facilitating computer-generated conversations, comprising:
    a platform comprising a plurality of servers, one or more of the servers configured to:
        receive via one of a plurality of chat channels a communication from a computing device directed at a chatbot hosted by the platform, the chatbot registered with the plurality of the chat channels and associated with a workflow comprising a plurality of steps, each of the chat channels associated with a communication format different from the communication formats associated with the remaining chat channels;
        perform an integrity check of the chat channel, the integrity check comprising verifying an identity of the chat channel via which the communication was received;
        upon the chat channel passing the integrity check, determine using the communication format of the chat channel via which the communication was received one of the steps in the workflow to be taken in response to the received communication;
        analyze the communication;
        generate a response communication based on the analysis and the determined step;
        format the response communication for transmission via the chat channel; and
        send the response communication via the chat channel to the computing device.

2. A system according to claim 1, one or more of the servers further configured to:
    register the chatbot with at least one of the plurality of servers, comprising:
        receive user input comprising one or more of name of the chatbot, an image of the chatbot, the workflow associated with the chatbot, components associated with the chatbot, and the plurality of the chat channels associated with the chatbot, and chat channel configuration preferences;
        generate the chatbot based on the user input;
        assign one of the servers comprised in the platform as an endpoint associated with the chatbot at which the communication is received and from which the response communication is sent, wherein the chatbot is one of a plurality of chatbots hosted by the platform and wherein all of the plurality of chatbots are associated with different ones of the servers comprised in the platform as their endpoints;
        generate credentials for the chatbot, the credentials comprising one or more of an identifier of the chatbot and a password associated with the chatbot;

configure the chatbot for the associated chat channels; and store the configured chatbot and the credentials in a storage interfaced to the one or more servers.

3. A system according to claim 1, one or more of the servers further configured to:

identify an intent of a user associated with the communication, wherein the response communication is generated based on the intent.

4. A system according to claim 3, one or more of the servers further configured to:

obtain a natural language processing of the received communication, wherein the intent is determined based on the natural language processing.

5. A system according to claim 4, one or more of the servers further configured to:

retrieve from an analytics service data associated with a user associated with the computing device;

interact with a third party service based on the natural language processing; and execute the workflow by the chatbot based on the retrieved data and the interaction, wherein the response communication is generated based on the execution.

6. A system according to claim 5, wherein the natural language processor is performed by one of at least one of the one or more servers and at least one third party server.

7. A system according to claim 1, one or more of the servers further configured to:

establish an interaction between the computing device and an additional computing device using different ones of the chat channels, comprising:

receive a request from the computing device for the interaction involving at least two different ones of the chat channels, the at least two different channels comprising the chat channel via which the communication was received and another one of the chat channels different from the chat channel via which the communication was received;

receive an identification of a chatroom created on the chat channel via which the communication was received, wherein the communication was received via the chatroom;

receive a request to join the chatroom from an additional computing device via the different chat channel;

send the communication received from the computing device to the additional computing device via the different chat channel;

receive an additional communication from the additional computing device via the different chat channel; and send the additional communication to the chatroom.

8. A system according to claim 1, wherein the one or more servers are in a cloud-computing environment and the chat channels are interfaced to the cloud-computing environment.

9. A system according to claim 1, one or more of the servers further configured to:

assign a classification to a user associated with the computing device based on the analysis of the parsed message;

execute the workflow based on the classification, wherein the response communication is generated based on the execution.

10. A system according to claim 9, one or more of the servers further configured to:

train the chatbot on a plurality of sample messages, wherein the classification is performed based on the training.

11. A method for facilitating computer-generated conversations, comprising:

receiving by a platform comprising a plurality of servers via one of a plurality of chat channels a communication from a computing device directed at a chatbot hosted by the platform, the chatbot registered with the plurality of the chat channels and associated with a workflow comprising a plurality of steps, each of the chat channels associated with a communication format different from the communication formats associated with the remaining chat channels;

performing by platform an integrity check of the chat channel, the integrity check comprising verifying an identity of the chat channel via which the communication was received;

upon the chat channel passing the integrity check, determining by the platform using the communication format of the chat channel via which the communication was received one of the steps in the workflow to be taken in response to the received communication;

analyzing by the platform the communication;

generating by the chatbot a response communication based on the analysis and the determined step;

formatting by the platform the response communication for transmission via the chat channel; and sending by the platform the response communication via the chat channel to the computing device.

12. A method according to claim 11, further comprising:

registering the chatbot with at least one of the plurality of servers, comprising:

receiving user input comprising one or more of name of the chatbot, an image of the chatbot, the workflow associated with the chatbot, components associated with the chatbot, and the plurality of the chat channels associated with the chatbot, and chat channel configuration preferences;

generating the chatbot based on the user input;

assigning one of the servers comprised in the platform as an endpoint associated with the chatbot at which the communication is received and from which the response communication is sent, wherein the chatbot is one of a plurality of chatbots hosted by the platform and wherein all of the plurality of chatbots are associated with different ones of the servers comprised in the platform as their endpoints;

generating credentials for the chatbot, the credentials comprising one or more of an identifier of the chatbot and a password associated with the chatbot;

configuring the chatbot for the associated chat channels; and storing the configured chatbot and the credentials in a storage interfaced to the one or more servers.

13. A method according to claim 11, further comprising:

identify an intent of a user associated with the communication, wherein the response communication is generated based on the -intent.

14. A method according to claim 13, further comprising:

obtaining a natural language processing of the parsed message, wherein the intent is determined based on the natural language processing.

15. A method according to claim 14, further comprising:
retrieving by at least one of the one or more servers from an analytics service data associated with a user associated with the computing device;
interacting with a third party service based on the natural language processing; and
executing the workflow by the chatbot based on the retrieved data and the interaction,
wherein the response communication is generated based on the execution.

16. A method according to claim 15, wherein the natural language processor is performed by one of at least one of the one or more servers and at least one third party server.

17. A method according to claim 11, further comprising:
establishing an interaction between the computing device and an additional computing device using different ones of the chat channels, comprising:
receiving a request from the computing device for the interaction involving at least two different ones of the chat channels, the at least two different channels comprising the chat channel via which the communication was received and another one of the chat channels different from the chat channel via which the communication was received;
receiving an identification of a chatroom created on the chat channel via which the communication was received, wherein the communication was received via the chatroom;
receiving a request to join the chatroom from an additional computing device via the different chat channel;
sending by the chatbot the communication received from the computing device to the additional computing device via the different chat channel;
receiving an additional communication from the additional computing device via the different chat channel; and
sending the additional communication to the chatroom.

18. A method according to claim 11, wherein the one or more servers are in a cloud-computing environment and the chat channels are interfaced to the cloud-computing environment.

19. A method according to claim 11, further comprising:
assigning a classification to a user associated with the computing device based on the analysis of the parsed message;
executing the workflow based on the classification,
wherein the response communication is generated based on the execution.

20. A method according to claim 19, further comprising:
training the chatbot on a plurality of sample messages,
wherein the classification is performed based on the training.

\* \* \* \* \*